United States Patent
Oshima et al.

(10) Patent No.: US 9,568,105 B2
(45) Date of Patent: Feb. 14, 2017

(54) SHAFT SEAL DEVICE

(71) Applicant: Eagle Industry Co., Ltd., Tokyo (JP)

(72) Inventors: Hiroki Oshima, Tokyo (JP);
Masamitsu Sanada, Tokyo (JP);
Takeshi Hosoe, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 87 days.

(21) Appl. No.: 14/350,329

(22) PCT Filed: Jan. 16, 2013

(86) PCT No.: PCT/JP2013/050604
§ 371 (c)(1),
(2) Date: Apr. 7, 2014

(87) PCT Pub. No.: WO2013/121812
PCT Pub. Date: Aug. 22, 2013

(65) Prior Publication Data
US 2014/0353925 A1 Dec. 4, 2014

(30) Foreign Application Priority Data

Feb. 15, 2012 (JP) ................................. 2012-030948

(51) Int. Cl.
*F16J 15/32* (2016.01)
(52) U.S. Cl.
CPC ......... *F16J 15/3204* (2013.01); *F16J 15/3244* (2013.01)
(58) Field of Classification Search
CPC .................................................... F16J 15/3244
See application file for complete search history.

(56) References Cited

U.S. PATENT DOCUMENTS 2,860,896 A * 11/1958 Naumann ............ F16J 15/3244
277/559
3,259,393 A * 7/1966 Dega ................... F16J 15/3244
277/559
(Continued)

FOREIGN PATENT DOCUMENTS

CN 1300909 6/2001 ............... F16J 15/32
EP 1 108 927 12/2000 ............... F16J 15/32
(Continued)

OTHER PUBLICATIONS

International Search Report issued in corresponding PCT Patent Appln. Serial No. PCT/JP2013/050604 dated Mar. 5, 2013, with English translation (2 pgs).
(Continued)

*Primary Examiner* — Vishal Patel
(74) *Attorney, Agent, or Firm* — Hayes Soloway P.C.

(57) ABSTRACT

A lip-type seal shaft seal device equipped with a lip seal for sealing a rotary member and a stationary member concentrically disposed to the inside and outside in a radial direction, has a plurality of aeration-creating parts for creating aeration through relative rotational sliding of the lip seal and the rotary member, formed in separated fashion in the circumferential direction on the outside peripheral surface of the rotary member. The aeration-creating parts are configured from a plurality of fine grooves arranged in the circumferential direction, extending along the axial direction of the rotary member. The lip of the lip seal extends towards the outside atmosphere side, leaving a portion of the aeration-creating parts at the sealed fluid side in the axial direction.

4 Claims, 11 Drawing Sheets

(56) References Cited

U.S. PATENT DOCUMENTS

| | | | | |
|---|---|---|---|---|
| 3,501,155 | A * | 3/1970 | Dega | F16J 15/3244 277/309 |
| 3,554,561 | A * | 1/1971 | Weinand | F16J 15/3244 277/559 |
| 3,589,739 | A * | 6/1971 | Scholten | F16J 15/3244 277/400 |
| 5,350,181 | A * | 9/1994 | Horve | F16J 15/3264 277/559 |
| 6,170,834 | B1 * | 1/2001 | Vogt | F16J 15/324 277/559 |
| 6,354,598 | B1 * | 3/2002 | Huang | F16J 15/3256 277/551 |
| 6,811,154 | B2 * | 11/2004 | Proctor | F16J 15/164 277/355 |
| 7,931,277 | B2 * | 4/2011 | Garrison | F16J 15/442 277/399 |
| 2006/0138729 | A1 * | 6/2006 | Arai | F16F 9/36 277/559 |
| 2007/0057472 | A1 * | 3/2007 | Hatch | B29C 45/14614 277/569 |
| 2008/0217865 | A1 * | 9/2008 | Sedlar | F16J 15/3224 277/572 |
| 2011/0241296 | A1 * | 10/2011 | Ting | F16J 15/3224 277/568 |
| 2012/0228829 | A1 * | 9/2012 | Sedlar | F16J 15/3244 277/309 |
| 2013/0111729 | A1 * | 5/2013 | Sedlar | F16J 15/32 29/428 |
| 2013/0175763 | A1 * | 7/2013 | Berdichevsky | F16J 15/3244 277/552 |
| 2013/0249170 | A1 * | 9/2013 | Sedlar | F16J 15/3244 277/549 |

FOREIGN PATENT DOCUMENTS

| | | | |
|---|---|---|---|
| JP | 57-186665 | 11/1982 | F16J 15/32 |
| JP | 10-331985 | 12/1998 | F16J 15/32 |
| JP | 2001-214979 | 8/2001 | F16J 15/32 |
| JP | 2005-273693 | 10/2005 | F16J 15/32 |
| JP | 2006-283775 | 10/2006 | F16J 15/32 |
| JP | 2009257421 | 11/2009 | F04B 39/00 |

OTHER PUBLICATIONS

English translation of International Preliminary Report on Patentability issued in corresponding PCT Patent Appln. No. PCT/JP2013/050604 dated Aug. 19, 2014 (5 pgs).

Chinese Office Action issued in application No. 201380003418.1, dated Apr. 28, 2015 (9 pgs).

* cited by examiner (a)

(b)

(a)

(b)

(a)

(b)

OUTSIDE ATMOSPHERE SIDE

SEAL FLUID SIDE

Prior Art

Prior Art

SHAFT SEAL DEVICE

TECHNICAL FIELD

The present invention relates to a lip-type seal shaft seal device for sealing a housing and a rotary shaft.

BACKGROUND ART

In a conventional lip-type seal installed in a stationary housing and creating a sliding tight seal at the surface of a rotary shaft, in order to address environmental issues, it has been attempted to reduce friction through optimization of the lip shape and dimensions and of the lip material; through coating of the lip sliding surface or of the surface of the shaft paired therewith; or through optimization of the surface roughness of the paired shaft.

A problem encountered with a seal in which the lip sliding surface or the surface of the paired shaft is coated, or with one in which surface roughness of the paired shaft is optimized, is that the effect is obtained only initially, and with the passage of time, reduced friction cannot be sustained due to wear.

The sealing means shown in FIG. 10 (hereinafter "Prior Art 1." See Patent Document 1, for example) is a known shaft seal device affording satisfactory lubricating characteristics. In Prior Art 1, the design incorporates a lip type seal 51 attached to a housing 50, the lip seal 51 having a sealing edge part 53 arranged so as to contact a rotary shaft 52. A contact zone 54 on the rotary shaft surface contacted by the sealing edge part 53 is equipped with an arrow-shaped grooved part 55 furnished with alternating grooves 56 and ridge parts 57, and as the rotary shaft 52 rotates inside the housing 50, the arrow-shaped grooved part 55 creates a pumping effect, which repels foreign matter infiltrating from the outside atmosphere side, as well as pushing back fluid from the sealed fluid side to maintain a sealing function.

Also known is a shaft seal device furnished with a helical groove in place of the arrow-shaped grooved part of Prior Art 1 (for example, see Patent Document 2).

Furthermore, the sealing means shown in FIG. 11 (hereinafter "Prior Art 2." See Patent Document 3, for example) is a known shaft seal device for achieving both low torque and sealing properties.

Prior Art 2 has a seal lip 60 for sealing in a sealed fluid, and a screw pump mechanism 64 disposed to the outside atmosphere side from the seal lip 60, and comprising a screw 62 formed on the surface of a rotary shaft 61, and a cylindrical part 63. The screw pump mechanism 64 creates a fluid pumping action towards the seal lip 60, substantially depressing the strained force of the seal lip 60, thereby ensuring sealing properties by the seal lip 60, as well as realizing lower torque of the seal lip 60 through the screw pump mechanism 64.

However, because the structure of the shaft seal device of Prior Art 1 shown in FIG. 10 is such that the sealing edge part 53 of the lip-type seal 51 contacts the arrow-shaped grooved part 55 formed of a high-hardness material furnished in the contact zone 54 on the rotary shaft surface, the sealing edge part 53 wears down quickly. Moreover, the grooves 56 of the arrow-shaped grooved part 55 have a "V" shape through which the sealed fluid side and the outside atmosphere side communicate directly in the axial direction, and the distal end part of the sealing edge part 53 does not contact the "V" shaped grooves 56, whereby the sealed fluid side and the outside atmosphere side are in a state of constant communication, thereby making it possible for the sealed fluid to leak out into the outside atmosphere side when the device is at rest. It is known that in a typical oil seal, shaft surface roughness of 2.5 µm or greater may result in leakage when at rest, and in the case of Prior Art 1, when the depth of the grooves 56 is 2.5 µm or greater, severe leaking will occur when at rest.

In the shaft seal device furnished with a helical groove in place of the arrow-shaped grooved part of Prior Art 1, the shape of the helical groove is such that the outside atmosphere side and the sealed fluid side are in direct contact therethrough, and therefore the design has the same problem as Prior Art 1.

Furthermore, in the shaft seal device of Prior Art 2 shown in FIG. 11, because the strained force of the seal lip 60 is depressed in order to lower the torque of the seal lip 60, the problem of depressed sealing properties of the seal lip 60, and of outside air becoming entrained to the sealed fluid side due to the fluid pumping action of the screw pump mechanism 64, were encountered.

CITATION LIST

Prior Art Document

Patent Document

Patent Document 1: Japanese Laid-Open Patent Application 2001-214979
Patent Document 2: Japanese Laid-Open Patent Application 10-331985
Patent Document 3: Japanese Laid-Open Patent Application 2005-273693

SUMMERY OF INVENTION

Technical Problem

The present invention was developed in order to solve the problems encountered in the aforedescribed prior art, it being an object to provide a lip-type seal shaft seal device, whereby both sustained sealing function and low friction in the seal section can be realized in a shaft seal device.

In order to achieve the aforementioned object, the shaft seal device of the present invention in a first aspect is a lip-type seal shaft seal device equipped with a lip seal for sealing a rotary member and a stationary member concentrically disposed to the inside and outside in a radial direction, an aeration-creating part for creating aeration through relative rotational sliding of the lip seal and the rotary member being formed in the circumferential direction on an outside peripheral surface of the rotary member, the aeration-creating part being configured from a plurality of fine grooves arranged in the circumferential direction and extending along the axial direction of the rotary member; and the lip of the lip seal extending towards the outside atmosphere side, leaving a portion of the aeration-creating part at the sealed fluid side in the axial direction.

According to this feature, aeration occurs within the grooves of the aeration-creating part of the rotary member through relative rotational sliding of the lip seal and the rotary member. Due to aeration occurring in this fashion, the liquid constituting the sealed fluid is blocked at a boundary at the aeration zone. At the same time, due to the relatively low viscosity of the liquid, friction is low between the sliding surfaces of the lip seal and the rotary member in the aeration zone.

Accordingly, both sustained sealing function and low friction in the seal section can be realized.

The shaft seal device of the present invention in a second aspect is shaft seal device according to the first aspect, the lip of the lip seal extending towards the outside atmosphere side and covering the aeration-creating part, leaving a portion of the aeration-creating part at the sealed fluid side in the axial direction, and configured to slide against the outside peripheral surface of the rotary member to the outside atmosphere side from the aeration-creating part.

According to this feature, because the lip of the lip seal is pressed against the outside peripheral surface of the rotary member to the outside atmosphere side from the aeration-creating part, leakage can be reliably prevented when at rest.

The shaft seal device of the present invention in a third aspect is shaft seal device according to the first aspect, the lip of the lip seal configured to slide against the outside peripheral surface of the rotary member in which the aeration-creating part is formed, leaving a portion of the aeration-creating part at the sealed fluid side and a portion at the outside atmosphere side, in the axial direction.

According to this feature, because the lip of the lip seal is configured to press against the outside peripheral surface of the rotary member in which the aeration-creating part has been formed, the aeration-creating part can be constituted such that the length thereof in the axial direction is greater as compared with the length of the lip seal in the axial direction, and the aerating action can be improved.

The shaft seal device of the present invention in a fourth aspect is shaft seal device according to any of the first to third aspects, the aeration-creating part being configured of grooves of periodic structure comprising a plurality of mutually parallel, linear asperities of unchanging pitch.

According to this feature, the aeration-creating part is easily formed, and the aeration performance can be made uniform throughout the aeration-creating part.

The shaft seal device of the present invention in a fifth aspect is shaft seal device according to any of the first to fourth aspects, the shape of the grooves in the aeration-creating part being square in cross section.

According to this feature, the grooves of the aeration-creating part are easily formed.

The shaft seal device of the present invention in a sixth aspect is shaft seal device according to any of the first to fourth aspects, the shape of the grooves in the aeration-creating part being undulating in cross section.

According to this feature, wear of the lip of the seal lip abutting the grooves of the aeration-creating part can be minimized.

The shaft seal device of the present invention in a seventh aspect is shaft seal device according to any of the fourth to sixth aspects, the grooves of periodic structure comprising a plurality of mutually parallel, linear asperities of unchanging pitch in the aeration-creating part being formed through irradiation by a femtosecond laser.

According to this feature, it is possible to improve control of the directionality of the grooves of periodic structure, and also possible to control the machining location, whereby the desired periodic structure can be formed in every one of subdivisions obtained by division into discrete small subdivisions.

EMBODIMENTS

While the embodiments of the shaft seal device according to the present invention are described in detail with reference to the drawings, the present invention shall not be construed as being limited thereto, and it will be apparent to a person skilled in the art that various changes, modifications, and improvements can be made without departing from the scope of the invention.

{First Embodiment}

Figure 1:
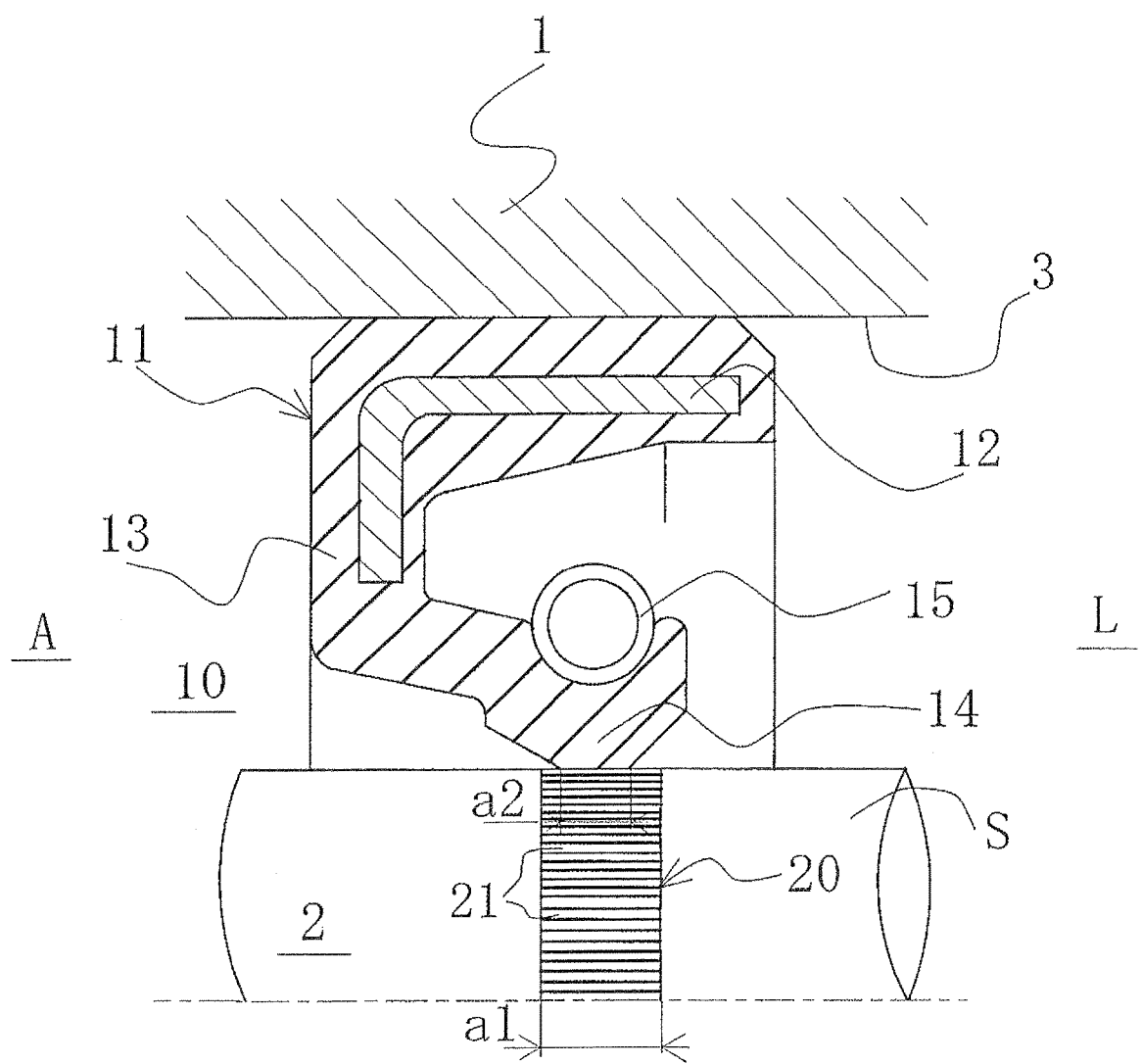
FIG. 1 A longitudinal sectional view representing the shaft seal device according to a first embodiment of the present invention.

FIG. 1 is a longitudinal sectional view showing the shaft seal device according to a first embodiment of the present invention.

In FIG. 1, a housing 1 is furnished with a rotary shaft passage hole 3 through which a rotary shaft 2 is inserted. The rotary shaft 2 is inserted through the rotary shaft passage hole 3, and the rotary shaft 2 is supported by bearings (not shown) or the like, across a prescribed gap from the peripheral wall of the rotary shaft passage hole 3.

Here, the rotary member and the stationary member are concentrically disposed to the inside and outside in a radial direction, the housing 1 corresponding to the stationary member, and the rotary shaft 2 corresponding to the rotary member.

A shaft seal device 10 is disposed between the rotary shaft 2 and the peripheral wall of the rotary shaft passage hole 3, and seals off the sealed fluid side L and the outside atmosphere side A.

In FIG. 1, the right side is the sealed fluid side L, and the left side is the outside atmosphere side A.

In the present invention, the sealed fluid is a liquid.

The shaft seal device 10 is equipped with a lip seal 11, partitioning the annular space across which the housing 1 and the rotary shaft 2 face into two spaces to the sealed fluid side L and to the outside atmosphere side A, and blocking the inside from the outside thereof. A seal lip member 13 made of an elastomer sheaths in an annular arrangement a reinforcing ring 12 having a substantially "L" shaped cross section in the radial direction. The rotary shaft 2 side of the seal lip member 13, i.e., the inside peripheral section, extends towards the sealed fluid side L and extends towards the inside peripheral side, and is substantially inverted triangle shaped in cross section, the edge-shaped section corresponding to the apex of the triangle forming a lip 14. When the lip 14 presses against the outside peripheral surface of the rotary shaft 2, the edge deforms and is capable of sliding over the outside peripheral surface of the rotary shaft 2 over a predetermined contact width in the axial direction.

A garter spring 15 for pressing the lip 14 against the outside peripheral surface of the rotary shaft 2 is installed on the outside periphery of the lip 14.

An aeration-creating part 20 is formed in the circumferential direction on the outside peripheral surface S of the rotary shaft 2. The aeration-creating part 20 and the lip 14 of the seal lip member 13 are arranged so as to slide along the outside peripheral surface of the rotary shaft 2 on which the aeration-creating part 20 has been formed, leaving a portion of the aeration-creating part 20 at the sealed fluid side L in the axial direction. The portion of the aeration-creating part 20 on the outside atmosphere side is not covered by the lip 14.

In this way, the aeration-creating part 20 communicates with the sealed fluid side L, but does not communicate with the outside atmosphere side A, due to the lip 14 pressing thereagainst.

The length a1 of the aeration-creating part 20 in the axial direction is set somewhat greater than the length a2 along which the lip 14 contacts the outside peripheral surface S of the rotary shaft 2.

The aeration-creating part 20 will be described in detail below.

{Second Embodiment}

Figure 2:
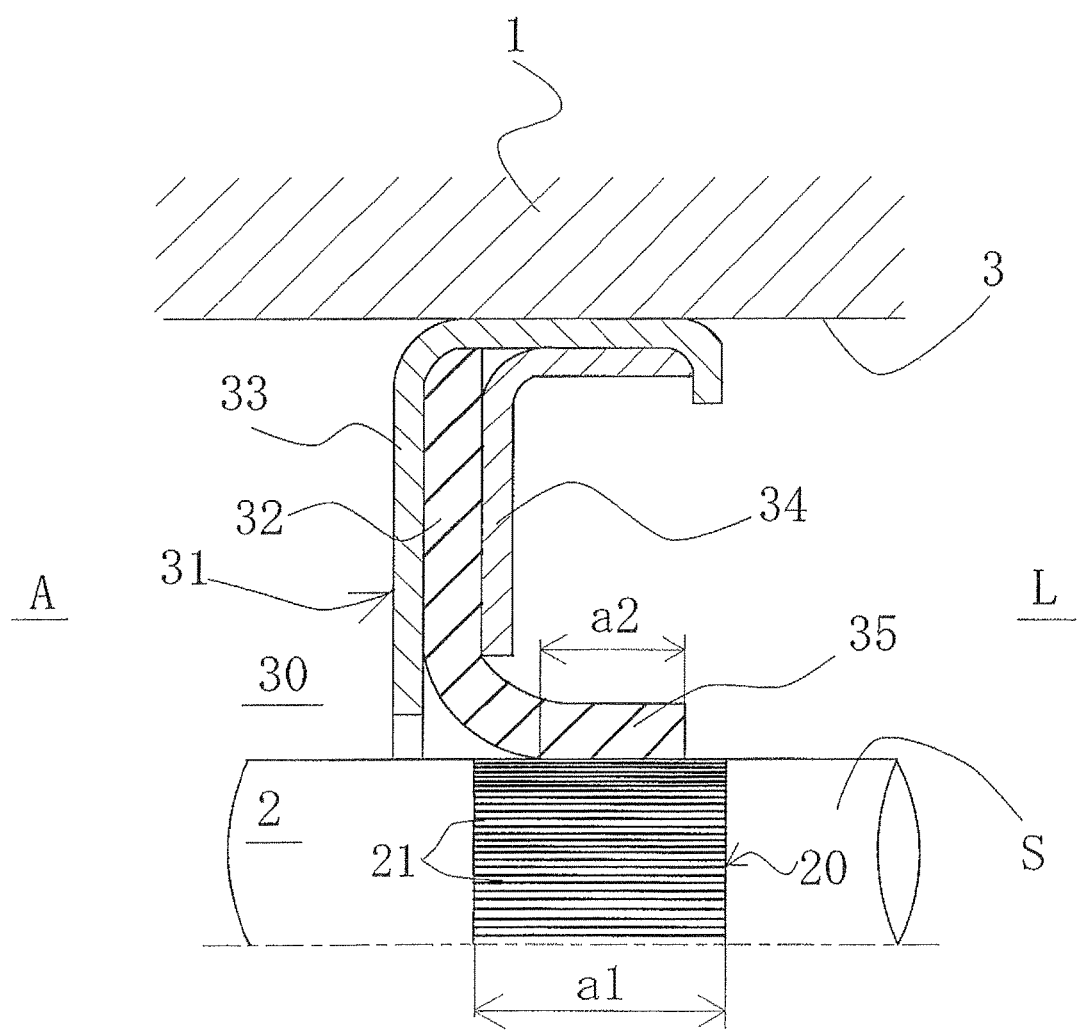
FIG. 2 Longitudinal sectional view representing the shaft seal device according to a second embodiment of the present invention.

FIG. 2 is a longitudinal sectional view showing the shaft seal device according to a second embodiment of the present invention.

In FIG. 2, reference signs identical to the reference signs assigned in FIG. 1 signify members identical to the members in FIG. 1, and detailed description thereof is omitted.

The shaft seal device 30 is equipped with a lip seal 31 partitioning the annular space across which the housing 1 and the rotary shaft 2 face into two spaces to the sealed fluid side L and to the outside atmosphere side A, and blocking the inside from the outside thereof. The lip seal 31 is equipped with a resin seal lip member 32 of "L" shaped cross section, the seal lip member 32 being sandwiched by an outer metal linking ring 33 of generally "L" shaped cross section, and an inner metal retainer ring 34 of generally "L" shaped cross section.

A cylindrical lip 35 is formed to the inside peripheral side of the resin seal lip member 32 of "L" shaped cross section, this cylindrical lip 35 coming into strong close contact against outside peripheral surface of the rotary shaft 2 and sealing in the sealed fluid.

An aeration-creating part 20 is formed in the circumferential direction on the outside peripheral surface S of the rotary shaft 2, in proximity to the zone of close contact of the cylindrical lip 35 and the outside peripheral surface of the rotary shaft 2. The aeration-creating part 20 is in essence identical to the aeration-creating part 20 of the first embodiment.

As in the first embodiment, the aeration-creating part 20 and the cylindrical lip 35 of the seal lip member 32 are arranged so as to slide along the outside peripheral surface of the rotary shaft 2 on which the aeration-creating part 20 has been formed, leaving a portion of the aeration-creating part 20 at the sealed fluid side L in the axial direction. The portion of the aeration-creating part 20 on the outside atmosphere side is not covered by the cylindrical lip 35.

In this way, the aeration-creating part 20 communicates with the sealed fluid side L, but does not communicate with the outside atmosphere side A, due to the cylindrical lip 35 pressing thereagainst. The portion of the aeration-creating part 20 on the outside atmosphere side is not covered by the cylindrical lip 35.

The length a1 of the aeration-creating part 20 in the axial direction is set somewhat greater than the length a2 along which the cylindrical lip 35 contacts the outside peripheral surface of the rotary shaft 2 in the axial direction.

The aeration-creating part 20 will be described in detail below.

{Third Embodiment}

Figure 3:
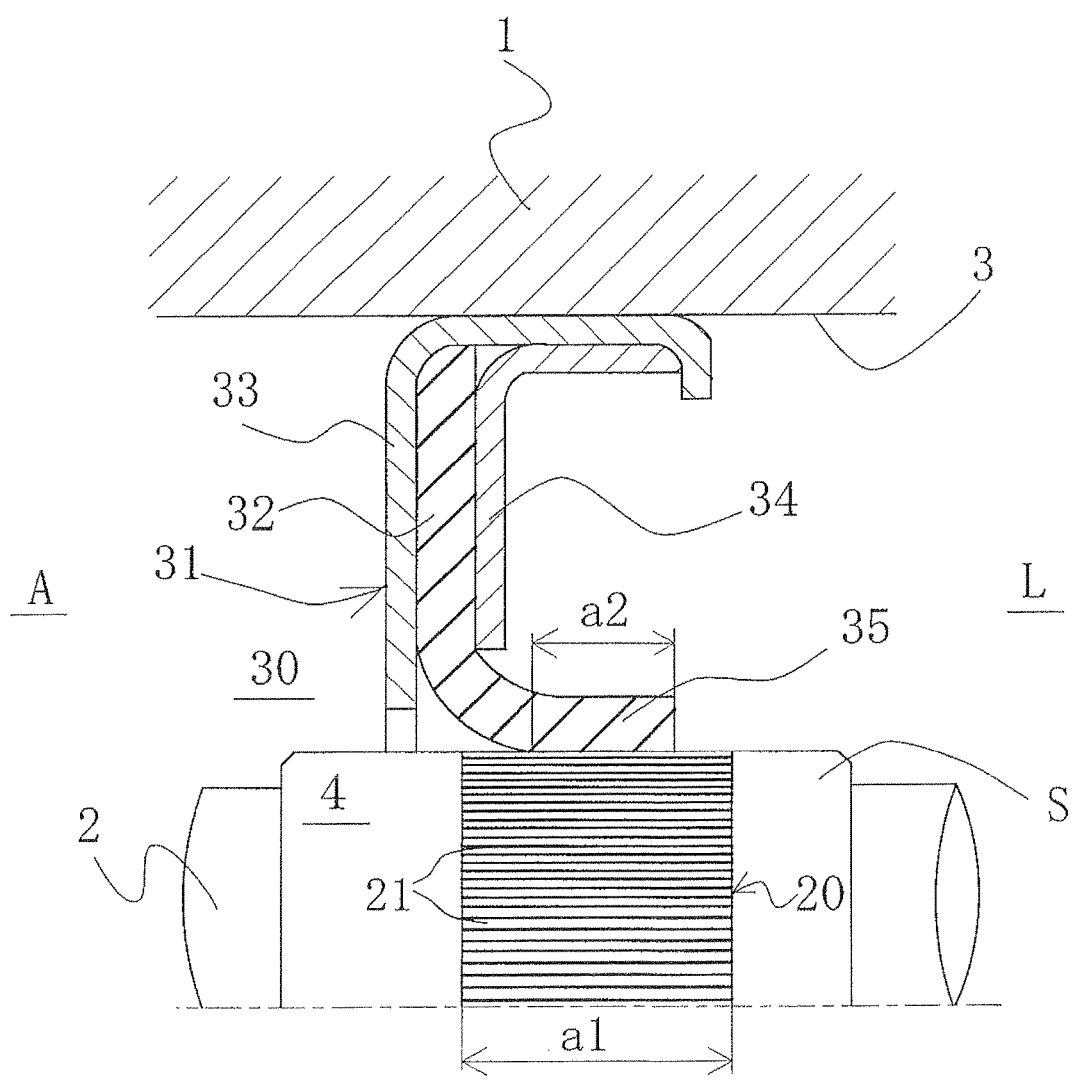
FIG. 3 Longitudinal sectional view representing the shaft seal device according to a third embodiment of the present invention.

FIG. 3 is a longitudinal sectional view showing the shaft seal device according to a third embodiment of the present invention.

In FIG. 3, reference signs identical to the reference signs assigned in FIG. 2 signify members identical to the members in FIG. 1, and detailed description thereof is omitted.

The third embodiment differs from the second embodiment in that a sleeve 4 for sealing is fitted together with the rotary shaft 2, but the configuration is otherwise identical to the second embodiment. An aeration-creating part 20 is formed in the circumferential direction on the outside peripheral surface S of the sleeve 4. Here, the sleeve 4 corresponds to the rotary member.

The aeration-creating part 20 will be described in detail below.

{Fourth Embodiment}

Figure 4:
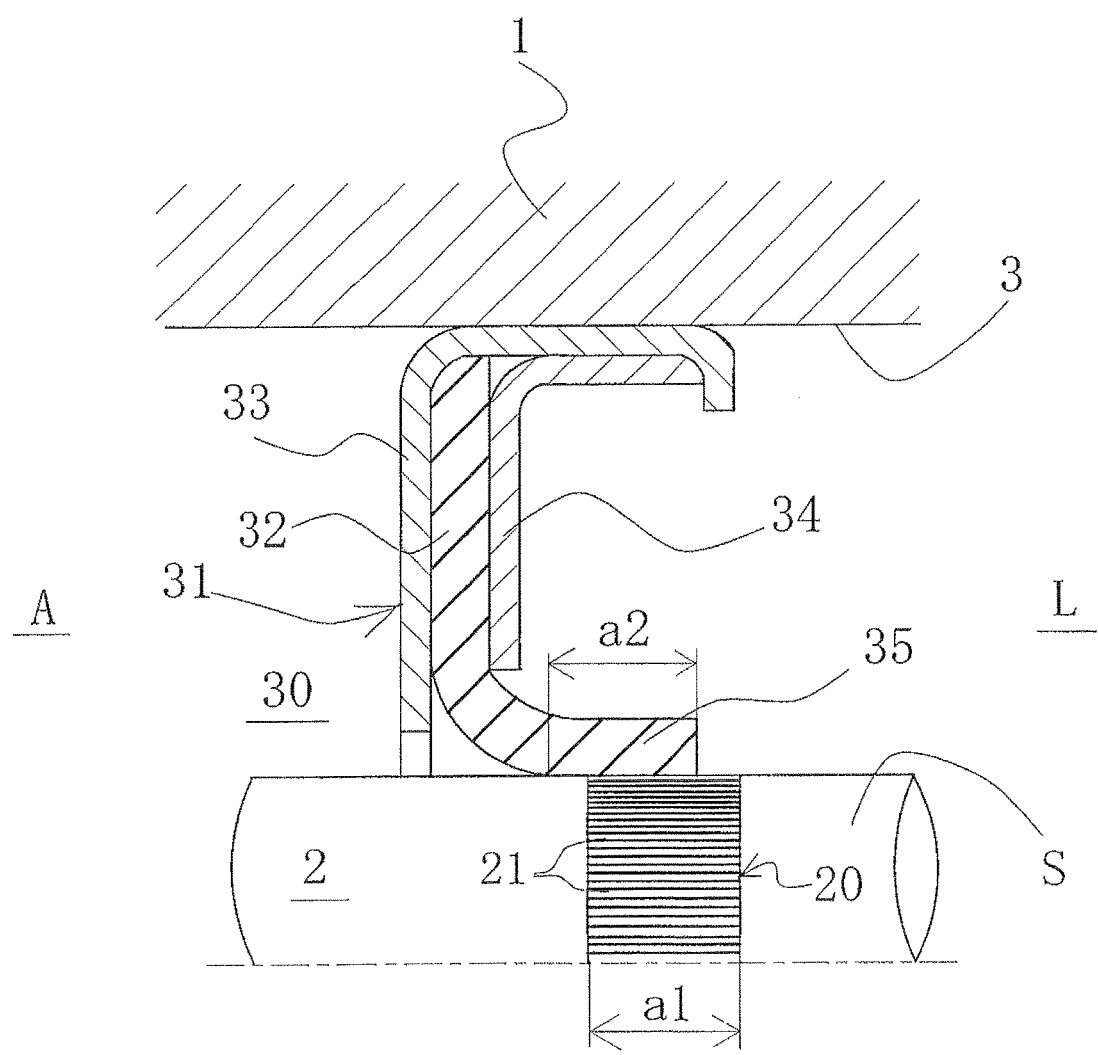
FIG. 4 Longitudinal sectional view representing the shaft seal device according to a fourth embodiment of the present invention.

FIG. 4 is a longitudinal sectional view showing the shaft seal device according to a fourth embodiment of the present invention.

In FIG. 4, reference signs identical to the reference signs assigned in FIG. 2 signify members identical to the members in FIG. 2, and detailed description thereof is omitted.

The fourth embodiment differs from the second embodiment in that the length a1 of the aeration-creating part 20 in the axial direction is set to substantially the same as, or somewhat less than, the length a2 along which the cylindrical lip 35 contacts the outside peripheral surface of the rotary shaft 2 in the axial direction; the aeration-creating part 20 and the cylindrical lip 35 of the seal lip member 32 are arranged such that the cylindrical lip 35 covers the aeration-creating part 20, leaving a portion of the aeration-creating part 20 at the sealed fluid side L in the axial direction; and the cylindrical lip 35 has a shape extended further towards the outside atmosphere side A, and is arranged so as to slide along the outside peripheral surface of the rotary shaft 2 to the outside atmosphere side A from the aeration-creating part 20.

Thus, the aeration-creating part 20 communicates with the sealed fluid side L, but does not communicate with the outside atmosphere side A, due to the cylindrical lip 35 pressing against the sliding surface S of the rotary shaft 2.

The aeration-creating part 20 will be described in detail below.

{Fifth Embodiment}

Figure 5:
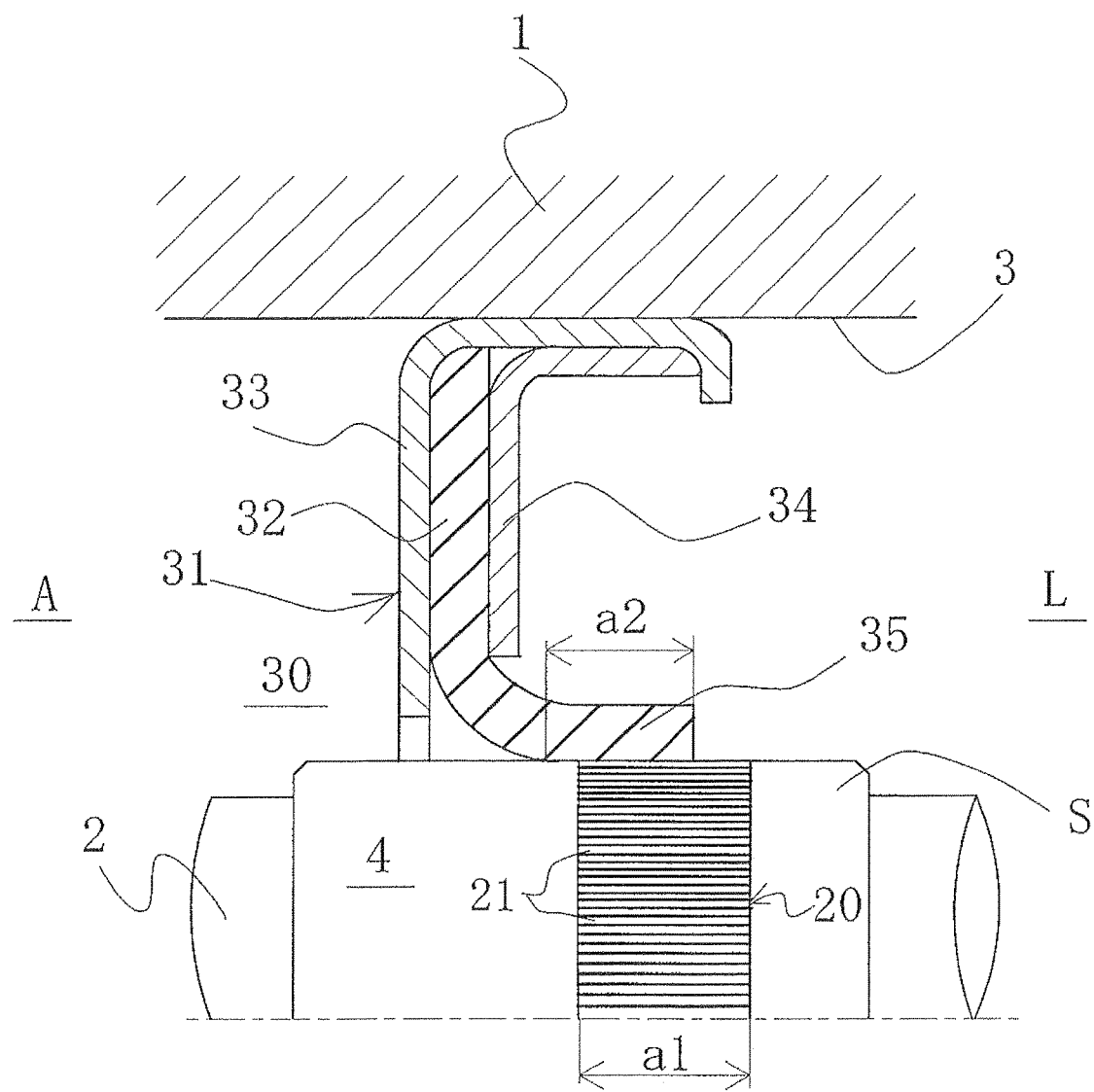
FIG. 5 Longitudinal sectional view representing the shaft seal device according to a fifth embodiment of the present invention.

FIG. 5 is a longitudinal sectional view showing the shaft seal device according to a fifth embodiment of the present invention.

In FIG. 5, reference signs identical to the reference signs assigned in FIG. 4 signify members identical to the members in FIG. 4, and detailed description thereof is omitted.

The fifth embodiment differs from the fourth embodiment in that in that a sleeve 4 for sealing is fitted together with the rotary shaft 2, but the configuration is otherwise identical to the fourth embodiment. An aeration-creating part 20 is formed in the circumferential direction on the outside peripheral surface S of the sleeve 4. Here, the sleeve 4 corresponds to the rotary member.

The aeration-creating part 20 will be described in detail below.

{Sixth Embodiment}

Figure 6:
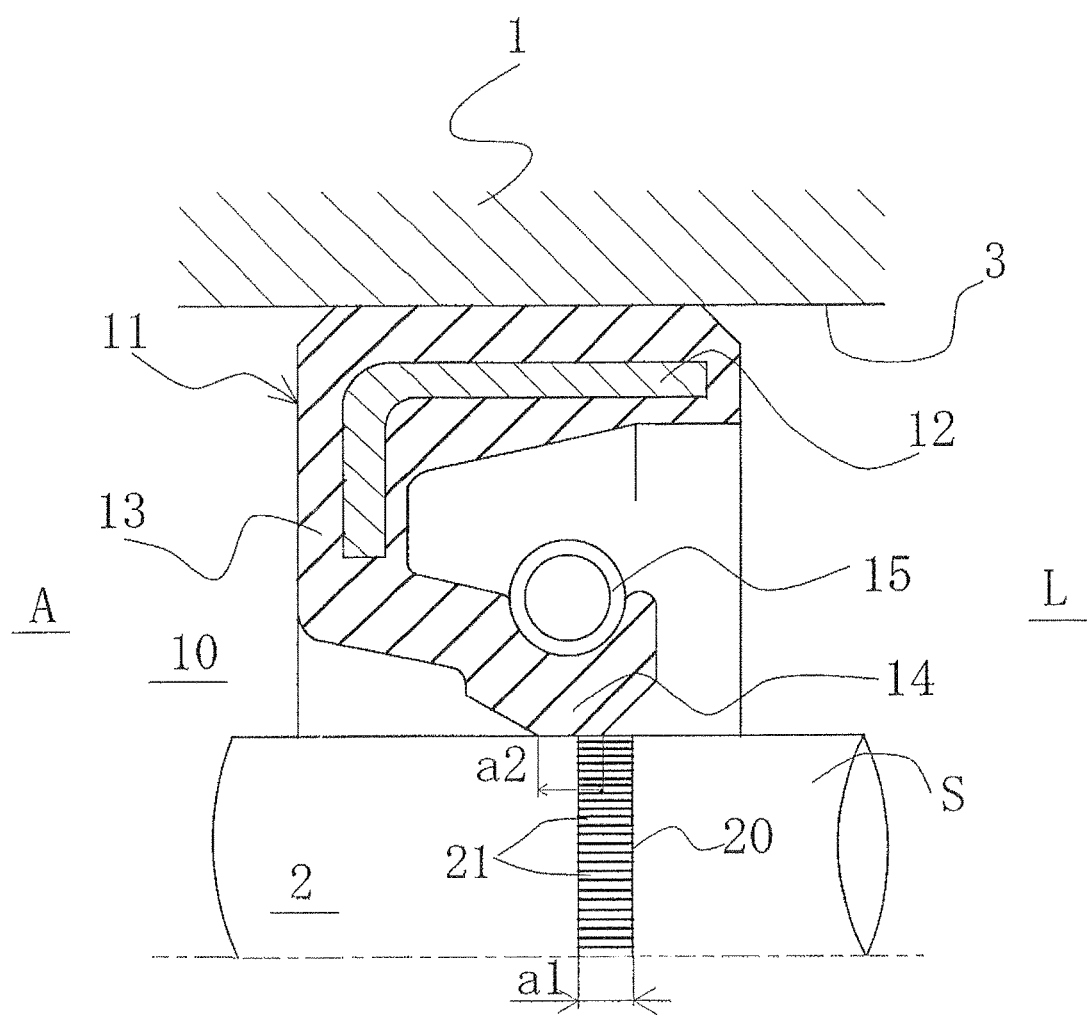
FIG. 6 Longitudinal sectional view representing the shaft seal device according to a sixth embodiment of the present invention.

FIG. 6 is a longitudinal sectional view showing the shaft seal device according to a sixth embodiment of the present invention.

In FIG. 6, reference signs identical to the reference signs assigned in FIG. 1 signify members identical to the members in FIG. 1, and detailed description thereof is omitted.

The sixth embodiment differs from the first embodiment in that the length a1 of the aeration-creating part 20 in the axial direction is set to substantially the same as, or somewhat less than, the length a2 along which the lip 14 contacts the outside peripheral surface of the rotary shaft 2 in the axial direction; the aeration-creating part 20 and the lip 14 of the seal lip member 13 are arranged such that the lip 14 covers the aeration-creating part 20, leaving a portion of the aeration-creating part 20 at the sealed fluid side L in the axial direction; and the lip 14 has a shape extended further towards the outside atmosphere side A, and is arranged so as to slide along the outside peripheral surface of the rotary shaft 2 to the outside atmosphere side A from the aeration-creating part 20.

In this way, the aeration-creating part 20 communicates with the sealed fluid side L, but does not communicate with the outside atmosphere side A, due to the lip 14 pressing against the sliding surface S of the rotary shaft 2.

The aeration-creating part 20 will be described in detail below.

In the first embodiment of FIG. 1 and the sixth embodiment of FIG. 6 described above, the assembly of the sleeve 4 fitted together with the rotary shaft 2 can be implemented in the same manner as in the third embodiment of FIG. 3 and the fifth embodiment of FIG. 5.

{Configuration of Aeration-Creating Part}

Figure 7:
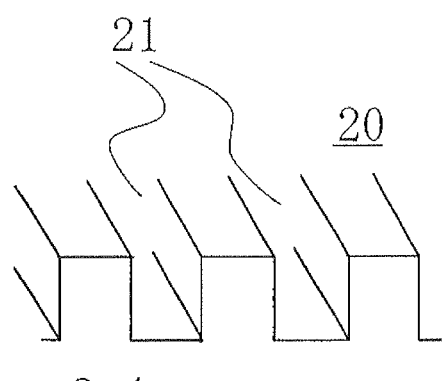
FIG. 7 Drawing illustrating the aeration-creating part furnished to the outside peripheral surface of the rotary shaft or sleeve in the shaft seal device according to the first to sixth embodiments of the present invention, showing a partial development of the outside peripheral surface of the rotary shaft or sleeve.
Figure 7:
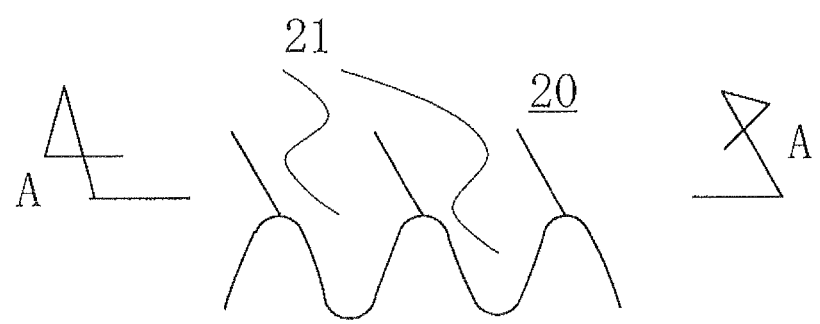

FIG. 7 is a drawing illustrating the aeration-creating part furnished to the outside peripheral surface of a rotary member such as a rotary shaft or sleeve, in the shaft seal device according to the first to sixth embodiments of the present invention, showing a partial development of the outside peripheral surface of the rotary member. In FIG. 7, of the first to sixth embodiments, the aeration-creating part 20 of the first embodiment is described by way of example; however, the aeration-creating parts 20 of the second to sixth embodiments are similar in structure.

It is generally known that aeration is produced when fine protrusions are present on sliding surfaces that slide relative to one another, sealing off the liquid side and the air side (for example, see "Microasperity Lubrication" J. N. Anno, J. A. Walowit, C. M. Allen, ASME J. Tribology, Vol. 24929, p. 351-355, 1968).

Aeration is a phenomenon that depresses the pressure of the seal part at sliding surfaces that slide relative to one another, thereby giving rise to bubbles in liquid.

In the present invention, aeration is created between the sliding surfaces in order to achieve low abrasion (also called "low friction") at the sliding surface of the lip 14 or cylindrical lip 35 of the seal lip, and the outside peripheral surface of the rotary member 2 or 4. In the present invention, in order to obtain this aeration, the aeration-creating part 20 for creating aeration through relative rotational sliding of the seal lip member 13 and the rotary member is formed in the circumferential direction on the sliding surface S of the rotary member in the aforedescribed manner. The aeration-creatine part 20 is configured from a plurality of fine grooves 21 arranged in the circumferential direction and extending alone the axial direction of the rotary member.

As shown in detail in representative fashion in FIG. 7, the fine grooves 21 which extend along the axial direction of the rotary member are a plurality of mutually parallel, linear asperities of unchanging pitch (in the present invention, also called "grooves of periodic structure"); however, there is no limitation thereto, and non-periodic structures are also acceptable. FIG. 7(a) shows grooves of periodic structure in which the shape of the grooves 21 is square in cross section, and FIG. 7(b) shows grooves of periodic structure in which the shape of the grooves 21 is undulating in cross section. The shape of the grooves 21 is not limited to square or undulating, and other shapes are acceptable.

As discussed below, the aforedescribed grooves of periodic structure are a fine structure formed by a femtosecond laser, for example.

The grooves of periodic structure may be formed coplanar to the outside peripheral surface of the rotary shaft 2 or the sleeve 4; or a recessed part may be formed on the outside peripheral surface, and the grooves formed on the bottom surface of the recessed part.

Figure 8:
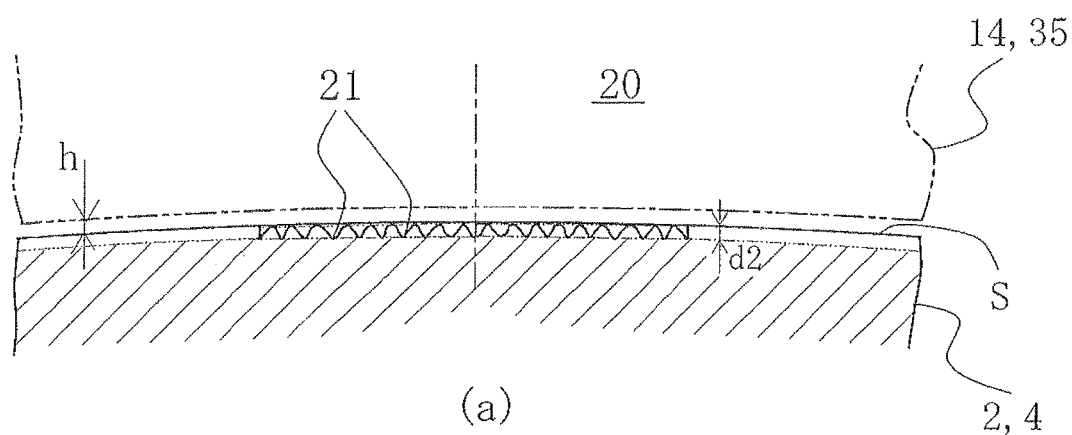
FIG. 8 A-A cross sectional view of FIG. 7.
Figure 8:
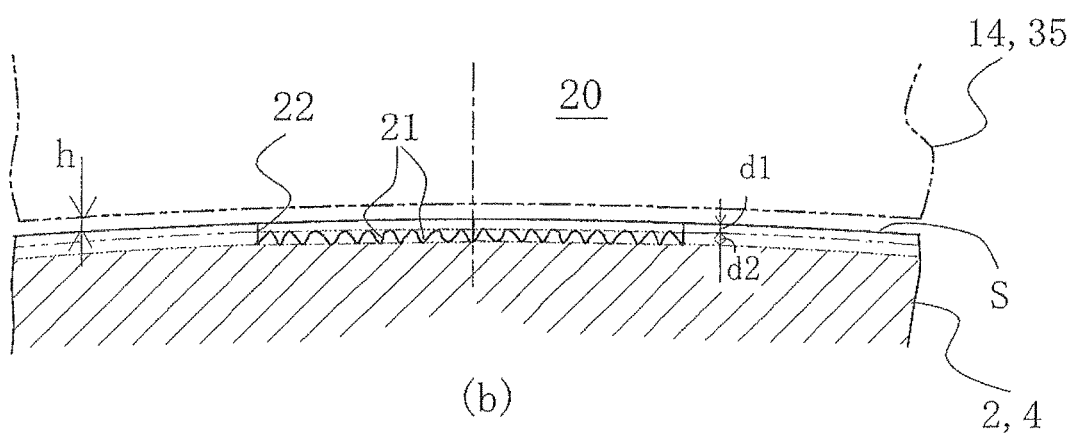

FIG. 8 is an A-A cross section of FIG. 7, in which (a) shows a case in which the aeration-creating part is furnished on the outside peripheral surface of the rotary member, and (b) shows a case in which the aeration-creating part is furnished on the bottom surface of a recessed part formed on the outside peripheral surface of the rotary member.

In order to achieve low abrasion at the sliding surface of the seal lip member against the outside peripheral face of the rotary member, normally, a 0.1 µm to 10 µm liquid film h, depending on the type of sealed fluid, the temperature, and so on, is formed between the sliding surfaces. In this case, taking a hypothetical plane connecting the apical points of the asperities in the aeration-creating part 20, depending on the liquid film h, the hypothetical plane will be set either coplanar to or below the sliding surface S. FIG. 8(a) shows a case in which the distance d1 between the sliding surface S and the hypothetical plane is 0, that is, the hypothetical plane is coplanar to the sliding surface S; and FIG. 8(b) shows a case in which the aeration-creating part 20 has been formed on the bottom part of a recessed part 22 formed on the sliding surface S, the hypothetical plane being set at a position lower by d1>0 with respect to the sliding surface S.

As shown in FIGS. 1 to 3, in a case in which the lip 14 or cylindrical lip 35 of the lip seal slides against the outside peripheral face of the rotary shaft 2 in which the aeration-creating part 20 has been formed, from the standpoint of preventing leakage when at rest, the distance d1 between the sliding surface S and the hypothetical plane is preferably set such that $0 \le d1 \le 2$ µm. The depth d2 from the hypothetical plane connecting the apical points of the asperities to the bottom part is preferably within the range 0≤d2≤2 μm, and the total of d1 and d2 is preferably 0≤d1+d2≤2.5 μm.

On the other hand, as shown in FIGS. 4 to 6, in a case in which the lip 14 or the cylindrical lip 35 of the lip seal slides against the outside peripheral face of the rotary shaft 2 to the outside atmosphere side from the aeration-creating part 20, the distance d1 between the sliding surface S and the hypothetical plane is preferably in the range d1=0-10 h; and the depth d2 from the hypothetical plane connecting the apical points of the asperities to the bottom part in the range d2=0.1-10 h.

Furthermore, while the pitch p of the asperities of the aeration-creating part 20 is set according to the viscosity of the sealed fluid, in any of the cases depicted in FIGS. 1 to 6, it is preferably 0.1 μm to 100 μm. In the case of a sealed fluid of high viscosity, a larger pitch p is better for sufficient entry of the fluid into the grooves.

In a case in which the aeration-creating part 20 is to be formed on the bottom part of the recessed part 22 formed on the sliding surface S, using a femtosecond laser, firstly, the recessed part 22 is formed, and then the aeration-creating part 20 is formed. In a case in which the aeration-creating part 20 is formed on the bottom part of the recessed part 22 formed on the sliding surface S, the sealed fluid can be drawn into the space inside the recessed part 22, creating more aeration such that there is no leakage to the outside atmosphere side from the aeration-creating part 20.

The aeration-creating part 20, which is a structure of a plurality of mutually parallel, linear asperities of unchanging pitch arranged accurately at a prescribed pitch (grooves of periodic structure), may be formed, for example, using a femtosecond laser, by dividing a predetermined area of the sliding surface S into subdivisions in an exacting manner, and controlling the direction of the asperities in accurate fashion so as to be parallel to the axial direction.

When a substrate is irradiated with a linearly-polarized laser at an irradiation intensity close to the threshold limit for machining, due to interference between the impinging light and scattered light or plasma waves along the surface of the substrate, a periodic structure of asperities having wavelength-order pitch and groove depth forms in self-organizing fashion orthogonally to the polarization direction. By performing the operation while overlapping the femtosecond laser at this time, a periodic structure pattern can be formed on the surface.

With such grooves of a periodic structure [formed] utilizing a femtosecond laser, it is possible to control the directionality thereof, and possible also to control the machining position, whereby grooves of a desired periodic structure can be formed. Specifically, by employing this method while rotating the outside peripheral surface of a cylindrical rotary shaft or sleeve, a fine cyclic pattern can be formed on the outside peripheral surface. With a machining method that utilizes a femtosecond laser, it is possible to form asperities of submicron-order depth effective for improving lubrication qualities of the lip-type seal and reducing leakage.

Formation of the grooves of a periodic structure is not limited to a femtosecond laser, and may instead employ a picosecond laser or electron beam. Moreover, formation of the grooves of a periodic structure may be accomplished by employing a die equipped with grooves of a periodic structure, by stamping or punching a cylindrical sliding surface while rotating it.

Furthermore, in a case in which the grooves of periodic structure are formed on the bottom part of a recessed part of the outside peripheral surface (sliding surface), the recessed part may be formed on the outside peripheral surface by etching, and thereafter the grooves of a periodic structure formed on the bottom part of a recessed part by a femtosecond laser or the like. Alternatively, only a periodic structure may be formed in the outside peripheral surface, by a femtosecond laser or the like, followed by plating or depositing a film around the grooves of periodic structure, to form an enclosure.

Figure 9:
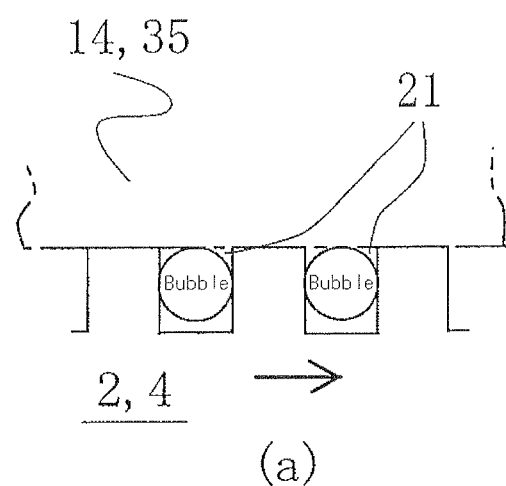
FIG. 9 Drawing illustrating creation of aeration in the aeration-creating part shown in FIG. 7.
Figure 9:
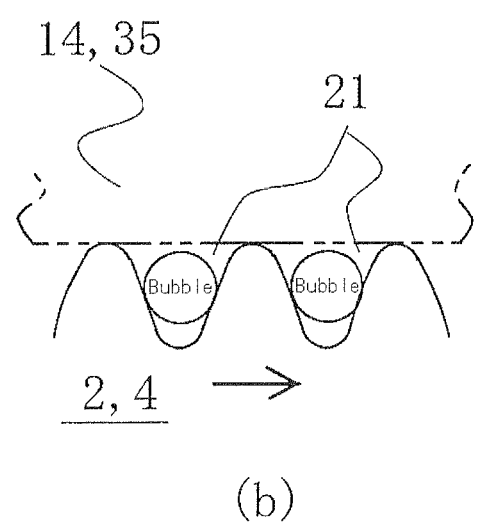
Figure 10:
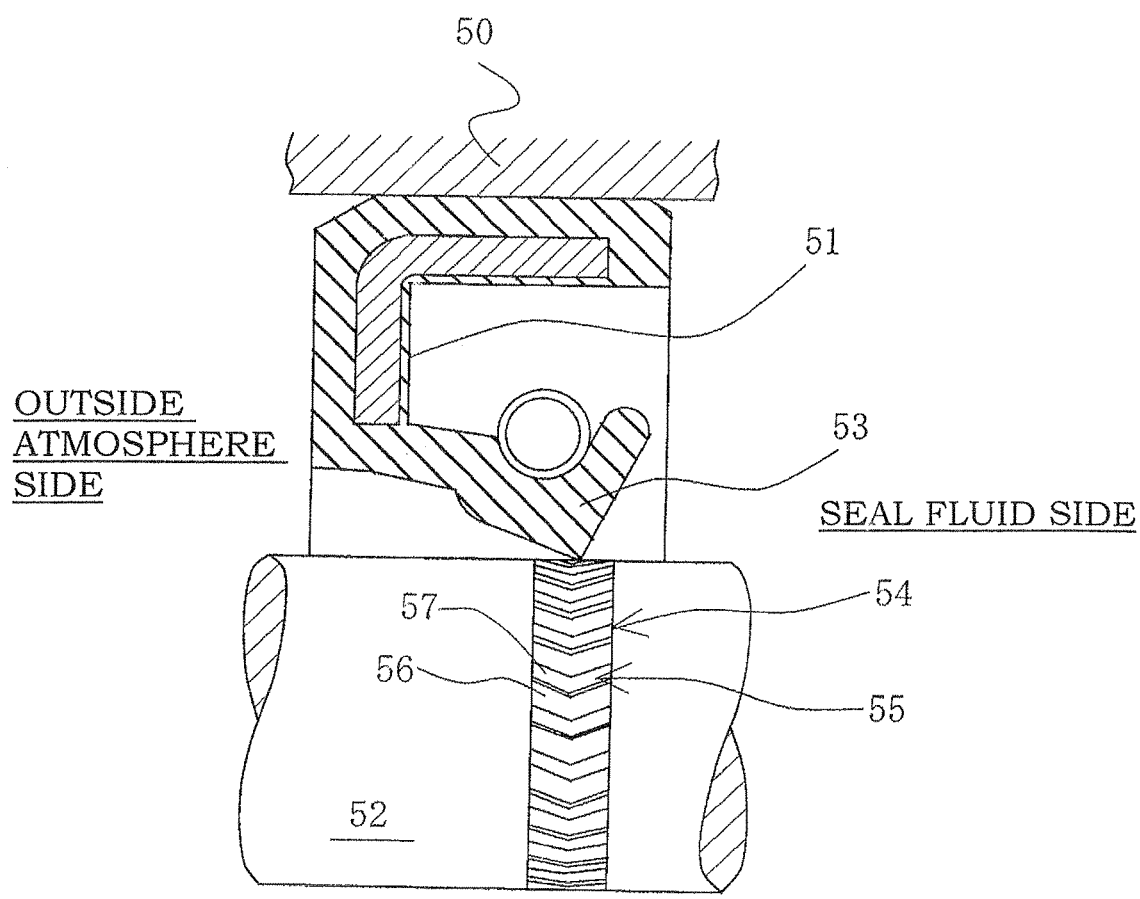
FIG. 10 Longitudinal sectional view illustrating Prior Art 1.
Figure 11:
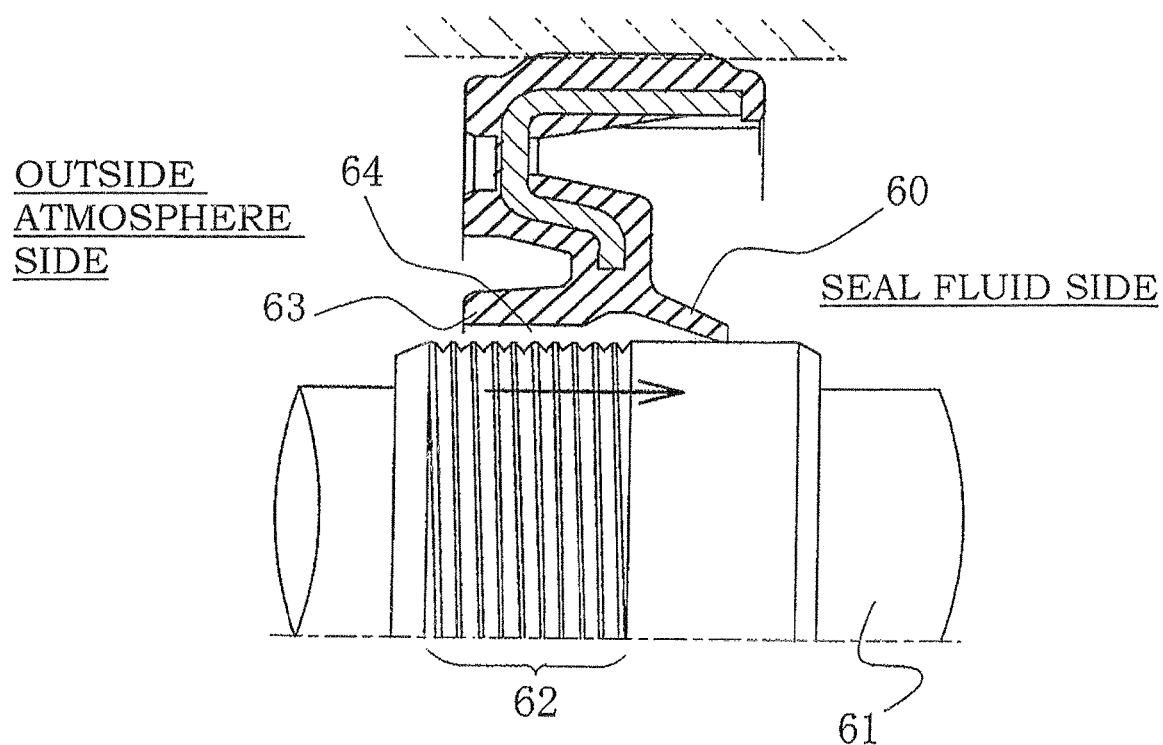
FIG. 11 Longitudinal sectional view illustrating Prior Art 2.

FIG. 9 is a drawing illustrating creation of aeration in the aeration-creating part shown in FIG. 7.

As the rotary shaft 2 rotates in the direction of the arrow, aeration is produced within the grooves 21 of the aeration-creating part 20 of the rotating member 2, 4 through relative rotational sliding of the lip seal and the rotary member. The aeration produced thereby blocks the liquid, i.e., the sealed fluid, at a boundary at the aeration zone. At the same time, due to the relatively low viscosity of fluid, the aeration zone minimizes abrasion at the sliding surfaces of the lip seal and the rotary member.

In a case in which the aeration-creating part 20 has been formed in the bottom part of a recessed part formed on the sliding surface S, the sealed fluid can be drawn into the space inside the recessed part, maximizing the thickness of the aeration zone.

As described above, when at rest, there is no communication with the outside atmosphere side A, due to pressing by the lip, thereby preventing leaks. During startup or during operation, aeration can be created within the aeration-creating part 20, preventing leaks, and lowering sliding torque at the sliding surface S so that wear can be reduced.

While the embodiments of the present invention have been described with reference to the drawings, the specific configuration is not limited to these embodiments; various changes, modifications, and improvements can be made without departing from the scope of the invention.

For example, the fine grooves 21 formed along the axial direction of the rotating member in the aeration-creating part 20 are not limited to a plurality of mutually parallel, linear asperities of unchanging pitch, and a non-periodic structure is acceptable as well.

Moreover, for example, the shape of the cross section of the grooves 21 is not limited to square or undulating; other shapes are acceptable as well.

Moreover, for example, the grooves of periodic structure are not limited to being formed by a femtosecond laser; a picosecond laser or electron be may instead employed instead.

Moreover, for example, the fine grooves 21 along the axial direction of the rotary member in the aeration-creating part 20 may be formed coplanar to the outside peripheral surface of the rotary shaft 2 or the sleeve 4; or after forming the recessed part 22 on the outside peripheral surface, formed on the bottom surface of the recessed part.

In cases in which the fine grooves have been furnished along the axial direction of the rotary member, an aeration effect is observed, as described in the preceding embodiments. However, in a case in which the fine grooves are furnished at an unchanging angle with respect to the axial direction of the rotary member, while aeration is produced, problems such as the following arise due to the angle of the grooves.

For example, in a case in which the angle of the grooves is inclined, with respect to the axial direction, in a direction that draws in the sealed fluid, aeration is produced, but too much of the sealed fluid becomes drawn in to excessive extent, and cannot be blocked, causing leakage. In a case in which the angle of the grooves is inclined, with respect to the axial direction, in a direction that expels the sealed fluid, aeration is produced with difficulty, causing abrasion.

REFERENCE SIGNS LIST

1: Housing
2: Rotary shaft
3: Rotary shaft passage hole
4: Sleeve
10: Shaft seal device
11: Lip seal
12: Reinforcing ring
13: Seal lip member
14: Lip
15: Garter spring
20: Aeration-creating part
21: Groove
22: Recessed part
30: Shaft seal device
31: Lip seal
32: Seal lip member
33: Metal linking ring
34: Metal retainer ring
35: Cylindrical lip
S Sliding surface of rotary member
L Sealed fluid side
A Outside atmosphere side

The invention claimed is:

1. A lip-type seal shaft seal device equipped with a rotary member, a stationary member concentrically disposed to an inside and an outside in a radial direction, and a lip seal fixed to the stationary member and having a contact face in slidable contact with an outer peripheral surface of the rotary member, the rotational member having, on the outer peripheral surface, an aeration-creating part which is partially covered with the contact face of the rotary member and on which a plurality of fine grooves of micron order pitch are formed for creating aeration through relative rotational sliding of said lip seal and said rotary member, a surrounding space of the aeration creating part of the rotary member being separated by the lip seal into an atmospheric space and a sealed fluid space, a pressure of the sealed fluid space being larger than a pressure of the atmospheric space and acting on the seal lip to encourage the contact between the seal lip and the rotary member, the contact face of said lip seal extending towards an end of the rotary member on a side of the atmospheric space in an axial direction such that the aeration-creating part of the rotary member does not communicate with the atmosphere space, leaving an uncovered portion of said aeration-creating part at the sealed fluid space, wherein the contact face of said lip seal has a first end and a second end, wherein the aeration-creating part of the rotary member has a length having a first end and a second end, wherein the first end of the aeration-creating part of the rotary member extends beyond the first end of the contact face while the second end of the aeration-creating part of the rotary member does not extend beyond the second end of the contact face, and wherein the fine grooves are of periodic structure comprising a plurality of linear asperities of unchanging pitch, mutually parallel to the rotary axis of the rotary member.

2. The shaft seal device according to claim 1, wherein the shape of the grooves in said aeration-creating part is square in cross section.

3. The shaft seal device according to claim 1, wherein the shape of the grooves in said aeration-creating part is undulating in cross section.

4. The shaft seal device according to claim 1, wherein the grooves of periodic structure comprising the plurality of mutually parallel, linear asperities of unchanging pitch in said aeration-creating part are formed through irradiation by a femtosecond laser.

* * * * *